UNITED STATES PATENT OFFICE.

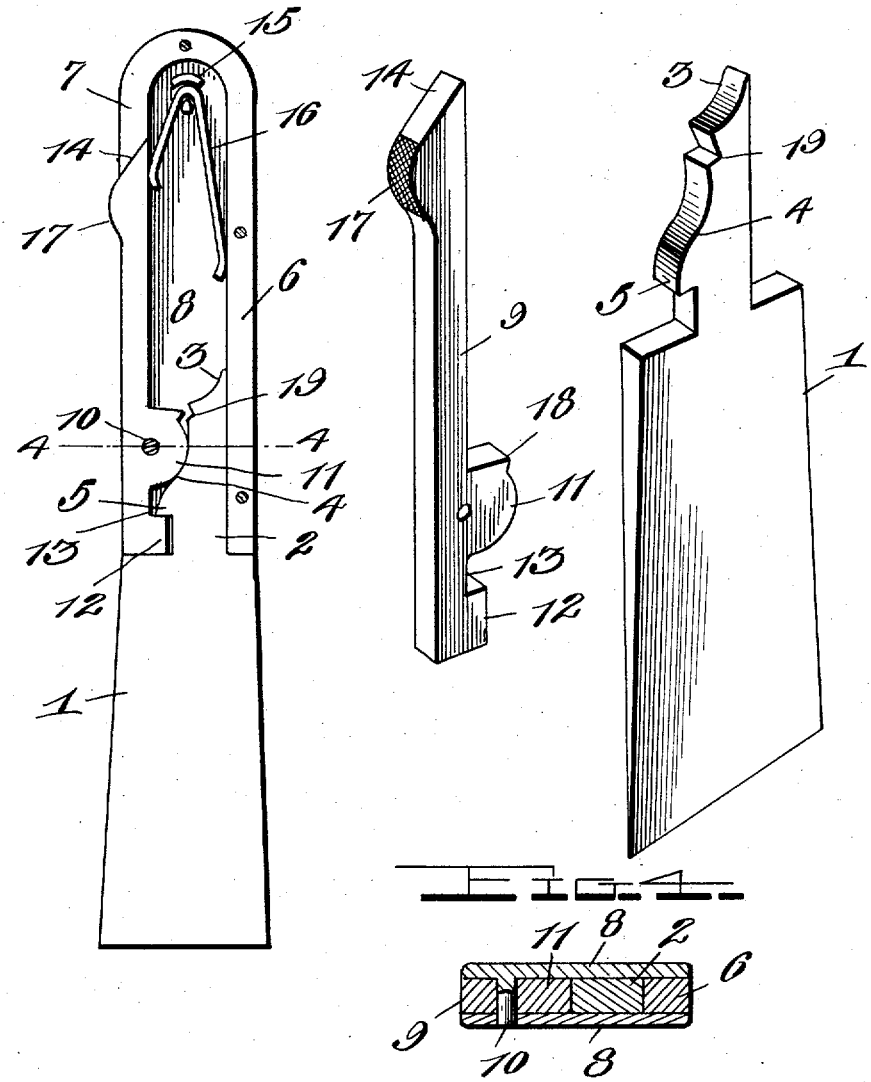

BERTRAM F. SEGEL, DECEASED, LATE OF BETHLEHEM, PENNSYLVANIA, BY HERMAN E. G. SEGEL, ADMINISTRATOR, OF SOUTH BETHLEHEM, AND OWEN F. MARSH, OF BETHLEHEM, PENNSYLVANIA.

TOOL.

1,018,210.  Specification of Letters Patent.  Patented Feb. 20, 1912.

Application filed May 25, 1911. Serial No. 629,520.

*To all whom it may concern:*

Be it known that BERTRAM F. SEGEL, deceased, late a citizen of the United States, residing at Bethlehem, in the county of Northampton and State of Pennsylvania, and OWEN F. MARSH, a citizen of the United States, residing at Bethlehem, in the aforesaid county and State, have invented certain new and useful Improvements in Tools, of which the following is a specification, reference being had to the accompanying drawings.

Our invention relates to new and useful improvements in tool handles and more particularly to a universal handle, and our object is to provide a handle of this character to which various tools may be readily applied and removed.

A further object of the invention resides in providing a handle with a spring-held locking lever thereon adapted to receive a notched shank of a tool, whereby the same may be securely held thereto.

A further object resides in providing means for partly forcing the tool from the handle when desired, and a still further object is to provide a device which is simple in construction, inexpensive to manufacture and one which will be extremely effective and useful in operation.

With these and other objects in view, our invention consists in the novel features of construction, combination and arrangement of parts as will be hereinafter referred to and more particularly pointed out in the specification and claims.

In the accompanying drawing forming a part of this application, Figure 1 is a section through the handle showing the tool applied thereto. Fig. 2 is a detail perspective of the locking lever removed from the handle. Fig. 3 is a fragmentary detail perspective of a tool showing the shank thereon, and, Fig. 4 is a detail section as seen on line 4—4, Fig. 1.

In carrying out our invention, we shall refer to the drawing in which similar reference characters designate corresponding parts throughout the several views, and in which 1 indicates a tool of any desired size and shape having a shank 2 thereon, said shank being reduced toward its outer or free end, and the extreme outer end thereof being beveled, as shown at 3. The junction between the reduced portion of the shank and the main portion thereof is not formed sharply, but designed concavo convex, as disclosed at 4, and continued upwardly to form a vertical projection 5, the outer face of which is convexed. The formation of the projection 5 on the shank leaves a notch or the like between said projection and the inner end of the tool blade 1, the purpose of which will be hereinafter and more particularly described. To receive this shank and securely retain the same, we have provided our improved handle which comprises a back rib or the like 6, one end of which is arcuately designed to form a substantial U at that point, the end being extended to form a short arm or the like 7. To this rib 6, is secured a pair of side plates 8 having one of their ends squared and the opposite ends arcuately designed coincident to the curvature of the one end of the rib 6, and it will be seen that when so formed, the greater portion of the rib 6 forms one side edge of the handle, the arcuately designed portion thereof forming one end thereof and the shorter arm 7 forming a portion of the other side edge thereof. This allows one end and one side edge of the handle to be uncovered, and in order to fill in this one side edge, I provide a lever or the like 9 which is pivoted by means of a pin 10 between said side plates 8. As stated, this lever 9 forms one of the side edges of the handle and is also a locking lever for the retaining of the shank within the handle proper, and to this extent, the lever is provided with an enlarged convexed portion 11 immediately below its pivotal point, and the end thereof at the open end of the handle member proper, is provided with an inwardly extending projection 12, thereby forming a notch or the like 13 between the projections 11 and 12.

The opposite end of the lever 9 and the free end of the arm 7 is beveled, as shown at 14, thereby limiting the movement of said lever in one direction, and mounted between a pair of guide members 15, is a bent leaf spring 16, one end of which is disposed to rest on the inner face of the rib 6, while the opposite end thereof is disposed into engagement with the lever 9 adjacent the beveled end thereof. It will be seen, therefore, that through the medium of this spring, the beveled end of the lever will be adapted to normally contact with the beveled end of the arm 7, thereby disposing the opposite end carrying the projection 12, somewhat inwardly, and in order to raise this last referred to end, pressure must be placed on the spring-held end, for the convenience of which, a bulged or milled portion 17 is provided on said lever. Thus, when it is desired to lock the handle on the shank of the tool, said shank is inserted in the open end of the handle member until the projection thereof enters the notch 13 of the lever. In accomplishing this result, it will be seen that the reduced end of the shank will readily enter the open end without contacting with the projection 12, but as the wider portion of the shank contacts with said projection, it will be seen that sufficient pressure must be exerted to overcome the tension of the spring 16 acting on the opposite end of the lever, and in this connection, it will also be seen that the concavo convex portion 4 on said shank will allow the projection 12 to readily ride thereover into locking engagement with the notch between the tool end and the projection 5 on the shank.

When the projection of the shank enters the notch of the lever and the projection of the lever enters the notch of the shank, the tool will be securely held within the handle in view of the tension of the spring at the opposite end of the lever, and in order to withdraw the shank from the tool, pressure must be placed on said lever at the bulged portion 17 immediately over said spring to release the locking lever from its effective position. In order to further aid the withdrawal of the tool from the handle, we have provided means for forcing said tool outwardly as the spring-held end of the lever is pressed inwardly, and to this extent, the convexed enlarged projection 11 is provided with a lug or tooth 18, and the upper face of the shank provided with a notch or the like 19. As the end of the lever is pressed inwardly to allow said lever to swing on its pivot, and raise the projection at the opposite end from the notch of the shank, the tooth 18 will enter the notch 19 and force said shank outwardly, thereby aiding greatly in the removal of the tool.

Of course, it will be understood that this lug and notch 18 and 19, respectively, may be eliminated, if desired, but through the use of the same, it will be seen that the shank of the tool may be forced outwardly sufficiently far to allow the projection 5 thereof to escape beyond the shoulder of the projection 12 of the lever, whereby pressure may be released from the opposite end of said lever without the notches and projections engaging one another, whereupon, the tool may be readily removed.

This handle, although particularly adapted for tools such as used by glaziers, may be readily used in any connection whatsoever wherein a handle or socket is necessary for a tool blade. In this manner, it will be seen that various and any number of tools may be provided, each with a shank, such as hereabove described, and one handle provided, whereby the tools may be interchanged at will.

Furthermore, it will be seen that the device is extremely simple in construction, inexpensive to manufacture and one which is extremely efficient and useful in operation.

Although we have specifically described our device, as shown in the drawing, it will be readily understood that various changes in form, proportion and in minor details of construction may be resorted to without sacrificing any of the principles or advantages of the invention.

What we claim is:—

1. In a device of the character described, the combination with a hollow handle member, a lever pivotally carried thereby and forming one of the side edges thereof, said lever being provided with a notch and a projection at one end thereof, an additional projection carried on said lever and means to dispose said lever normally in its effective position; of a tool having a shank thereon provided with a notch and projection adapted to be inserted in the handle and, respectively, receive the projection and notch of said lever, said shank being also provided with an additional notch adapted to receive the additional projection of the lever when moved to its ineffective position to force said shank from the handle.

2. In a device of the class described, the combination with a handle member, a lever pivotally carried therein and forming one of the side edges thereof, said lever being provided at one of its ends with a notch and projection, spring means within said handle member engaging the opposite end of said lever to force the same outwardly, means to limit the movement of said lever, said lever being provided with a convexed portion immediately adjacent the notch therein, and a lug formed at one end of said convexed portion; of a tool having a shank thereon adapted for insertion in the open end of said handle member, said shank being provided with a projection and notch to, respectively, engage the notch and projection of said lever, said shank being also provided with an additional notch adapted to receive the lug on the convexed portion of said lever when said lever is disengaged with the shank, whereby said shank will be forced from the handle member when the free end of the lever is pressed inwardly.

3. A device of the class described, comprising a handle member, a locking lever pivotally mounted therein and forming one of the side edges thereof, and spring means to retain said lever in its normal effective position; of a tool having a shank thereon adapted to be inserted in the open end of said handle member, interlocking means between said lever and shank, said lever being provided with an enlarged convexed portion adjacent its pivotal point, a lug formed at one end of said convexed portion, said shank being provided with a concaved portion to receive the convexed portion of said lever and also provided with a notch adapted to receive the lug of said lever when the latter is moved to its ineffective position, whereby said shank will be forced from the handle member when the free end of the lever is pressed inwardly.

4. In a device of the class described, the combination with a hollow handle member having a channel-way formed in one side edge thereof, the end wall of said channel-way being beveled, a lever pivoted intermediate of its ends to the walls of said handle member and forming a closure for the channel-way, the one end of said lever being beveled coincident to the beveling of the end wall of said channel-way and adapted to contact with the latter to limit the movement of said lever in one direction, said lever being also provided with a notch and projection at the opposite end thereof and having a second projection immediately adjacent its pivotal point, and spring means within the handle member having engagement with said lever to force the beveled end thereof in normal contact with the beveled end wall of the channel-way of said handle member; of a tool having a shank thereon adapted for insertion within the open end of said handle member, said shank being provided with a projection and notch to, respectively, engage the notch and projection at the one end of said lever, said shank being also provided with a second notch adapted to receive the second projection of said lever when the one end of the latter is forced inwardly against the tension of said spring, whereby said shank will be forced from the handle member.

5. In a device of the class described, the combination with a hollow handle member provided with a channel-way in one side edge thereof, a lever pivoted intermediate of its ends and the walls of said handle member and forming a closure for said channel-way, the one end of said lever being adapted to engage the end wall of said channel-way to limit the movement of said lever in one direction, said lever being provided at its opposite end with a notch and projection and also having an additional projection thereon immediately adjacent its pivotal point, and spring means to normally force the one end of said lever against the wall of the channel-way of the handle member; of a tool having a shank thereon adapted to be inserted in the open end of said handle member, said shank being provided with a notch and projection adapted to engage, respectively, the projection and notch of said lever, said shank being also provided with an additional notch adapted to receive the additional projection of the lever when the free end thereof is forced inwardly to disengage the notches and projections of said shank and lever, whereby said shank may be forced from the handle member.

In testimony whereof we hereunto affix our signatures in the presence of two witnesses.

HERMAN E. G. SEGEL,
*Administrator of the estate of Bertram F. Segel, deceased.*
OWEN F. MARSH.

Witnesses:
HARRY C. COPE,
CARL SNYDER.

---

Copies of this patent may be obtained for five cents each, by addressing the "Commissioner of Patents, Washington, D. C."